(12) United States Patent
Eldada et al.

(10) Patent No.: US 6,542,684 B2
(45) Date of Patent: Apr. 1, 2003

(54) OPTIMIZED MULTI-LAYER OPTICAL WAVEGUIDING SYSTEM

(75) Inventors: Louay Eldada, Acton, MA (US); Deepti Pant, Framingham, MA (US); Karl Beeson, Princeton, NJ (US); George Boudoughian, Towaco, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/846,691

(22) Filed: May 1, 2001

(65) Prior Publication Data

US 2003/0026569 A1 Feb. 6, 2003

(51) Int. Cl.$^7$ .................................................. G02B 6/10
(52) U.S. Cl. ........................ 385/129; 385/131; 385/2; 385/37
(58) Field of Search ................. 385/1–10, 14, 385/16, 129–132, 141–145, 147, 140, 23; 264/1.1, 1.24, 1.25; 438/29, 31, 32; 65/386

(56) References Cited

U.S. PATENT DOCUMENTS

| | | | |
|---|---|---|---|
| 4,609,252 A | | 9/1986 | Wong et al. ............. 350/96.12 |
| 5,134,681 A | * | 7/1992 | Ratovelomanana et al. . 385/129 |
| 5,291,574 A | * | 3/1994 | Levenson et al. ............ 216/2 |
| 5,837,804 A | * | 11/1998 | Yamagishi et al. ..... 264/331.19 |
| 5,861,976 A | | 1/1999 | Hockstra ................... 359/288 |
| 5,896,484 A | * | 4/1999 | Borrelli et al. ............. 359/900 |
| 5,903,697 A | | 5/1999 | Yamada et al. ............. 385/129 |
| 5,940,568 A | * | 8/1999 | Losch ........................ 385/129 |
| 6,114,090 A | | 9/2000 | Wu et al. ................. 430/281.1 |
| 6,210,867 B1 | * | 4/2001 | You et al. ..................... 216/24 |
| 6,229,949 B1 | * | 5/2001 | Ido et al. .................... 385/132 |
| 6,306,563 B1 | * | 10/2001 | Xu et al. .................... 385/122 |
| 6,327,415 B1 | * | 12/2001 | Koyano et al. ............. 385/143 |
| 6,335,149 B1 | | 1/2002 | Xu et al. .................... 430/231 |
| 2002/0021879 A1 | * | 2/2002 | Lee et al. ................... 385/129 |

FOREIGN PATENT DOCUMENTS

| JP | 1-138509 | 5/1989 |
|---|---|---|
| WO | WO 98/45759 | 10/1998 |

* cited by examiner

*Primary Examiner*—Hemang Sanghavi
*Assistant Examiner*—Scott Knauss
(74) *Attorney, Agent, or Firm*—Roberts & Mercanti, LLP

(57) ABSTRACT

A single mode optical waveguide which is lithographically formed and employs polymeric materials having low propagation loss. The optical waveguide has a substrate, a polymeric, buffer layer having an index of refraction $n_b$ disposed on a surface of the substrate, a patterned, light-transmissive core layer having an index of refraction $n_c$ disposed directly on a surface of the cladding layer, and an overcladding layer having an index of refraction $n_o$ on a top surface of the core, side walls of the core, and exposed portions of the buffer layer, with $n_b<n_o<n_c$ and $\Delta n=n_c-n_o$.

25 Claims, 3 Drawing Sheets

OPTIMIZED MULTI-LAYER OPTICAL WAVEGUIDING SYSTEM

BACKGROUND OF THE INVENTION

1. Field of the Invention

The present invention relates to planar or "integrated" optical waveguides, and particularly to lithographically-formed single-mode waveguides employing organic and polymeric materials.

2. Technical Background

Multilayer optical waveguiding structures are used to build integrated optical circuits that-route and control optical signals in a optical fiber communication system. In optical communication systems, messages are transmitted at infra-red optical frequencies by carrier waves that are generated using sources such as lasers and light-emitting diodes. There is interest in these optical communication systems because they offer several advantages over electronic communications systems using copper wires or coaxial cable. They have a greatly increased number of channels of communication, as well as the ability to transmit messages at much higher speeds than electronic systems.

This invention is concerned with the formation of light-transmissive optical waveguide devices. The operation of an optical waveguide is based on the fact that when a core medium which is transparent to light is surrounded or otherwise bounded by another cladding medium having a lower refractive index, light introduced along the core medium's axis is highly reflected at the boundary with the surrounding cladding medium, thus producing a light-guiding effect.

It is possible to produce polymeric optical waveguides and other optical devices which transport optical signals via optical circuitry or optical fiber networks. One method used to form an optical waveguide device involves the application of standard photolithographic processes. Photopolymers are of particular interest for optical applications because they can be patterned by photolithographic techniques which are well known in the art. Photopolymers also offer opportunities for simpler, more cost-effective manufacturing processes. Lithographic processes are used to define a pattern in a light-sensitive, photopolymer-containing layer deposited on a substrate. This layer may itself consist of several layers composed of the same or different polymeric materials having dissimilar refractive indices, to form a core, overcladding, and under cladding layers or structures.

Among the many known photopolymers, acrylate materials have been identified as suitable for optical waveguides because of their optical clarity, low birefringence, and ready availability of a wide range of monomers.

Planar polymer waveguides typically comprise layers of low loss optical materials of precise indices of refraction. Both step index and gradient index waveguide structures are known in the art. For planar polymer and glass waveguides, step index structures are most easily achieved through successive coating of materials with differing refractive indices. Typically, a core has a refractive index which is 0.5% to 2% higher than its overcladding. The magnitude of this refractive index difference ($\Delta n$) is set to optimize the performance of the planar waveguides, or to match light modes when the transition is made from the planar device to an optical fiber.

In practice, most planar waveguide structures have a configuration wherein a buffer layer is applied to a silicon substrate, then an underclad is applied to the buffer, followed by application and patterning of a core layer, and followed finally by application of an overclad. In some instances, the buffer layer can serve as the under clad.

If these multiple layers are not optimized, several problems can occur. These include high optical loss due to absorption of light by the substrate; high polarization dependent loss (PDL); if heating is performed (for tuning or switching), the increase of temperature alters the index of refraction in such a way as to push light out at least partially out of the core where is can interact with the cladding and/or the substrate to produce a variety of unwanted interactions which can, for example, lead to loss and PDL; and if the waveguide incorporates a grating, secondary reflections or an unwanted broadening of the wavelength of the reflected signal can be observed.

SUMMARY OF THE INVENTION

The invention provides a single-mode optical waveguide fabricated on a substrate, the substrate defining a surface, the single-mode optical waveguide comprising a polymeric, buffer layer is disposed on the surface of the substrate, the polymeric, buffer layer defining a surface and having an index of refraction $n_b$. A patterned, light-transmissive core layer disposed directly on the surface of the buffer layer, the patterned, light-transmissive core layer defining a top surface and a pair of side walls, the patterned, light-transmissive core layer having an index of refraction $n_c$. An overcladding layer is disposed on the top surface of the core, the pair of side walls of the core, and the buffer layer, the overcladding layer having an index of refraction $n_o$, such that $n_b < n_o < n_c$ and $\Delta n = n_c - n_o$, wherein the value of $\Delta n$ produces a single-mode waveguide at optical communication wavelengths.

The invention also provides a method for forming a single-mode optical waveguide on a substrate, the substrate defining a surface, the method comprising the steps of depositing a polymeric, buffer layer onto the surface of the substrate, the polymeric, buffer layer defining a surface and having an index of refraction $n_b$. One then deposits a patterned, light-transmissive core layer directly onto the surface of the polymeric, buffer layer without any intermediate layers, the patterned, light-transmissive core layer defining a core having a top surface and a pair of side walls, the patterned, light-transmissive core layer having an index of refraction $n_c$. One then deposits an overcladding layer onto the top surface of the patterned, light-transmissive core layer, the side walls of the patterned, light-transmissive core layer, and a portion of the polymeric, buffer layer, the overcladding layer having an index of refraction $n_o$, such that $n_b < n_o < n_c$ and $\Delta n \, n_c - n_o$.

The invention further provides a method for forming a single-mode optical waveguide on a substrate, the substrate defining a surface, the method comprising the steps of depositing a buffer layer onto the surface of the substrate, the buffer layer being fabricated from a polymeric, material having an index of refraction $n_b$, the buffer layer defining a surface. One then deposits a core layer directly onto the surface of the buffer layer without any intermediate layers, the core layer being fabricated from a light-transmissive material having an index of refraction $n_c$. One then patterns the core layer to define a core with a top surface and a pair of side walls and to expose portions of the buffer layer. One then deposits an overcladding layer onto the top surface of the core layer, the side walls of the core layer, and the exposed portions of the buffer layer, the overcladding layer having an index of refraction $n_o$, such that $n_b<n_o<n_c$ and $\Delta n=n_c-n_o$, wherein the value of $\Delta n$ produces a single-mode waveguide at optical communication wavelengths.

The invention still further provides a method for forming an optical waveguide on a substrate, the substrate defining a surface, the method comprising the steps of depositing a polymeric, buffer layer onto the surface of the substrate, the polymeric, buffer layer defining a surface and having an index of refraction $n_b$. One then deposits a photosensitive core layer directly onto the surface of the polymeric, buffer layer without any intermediate layers, the photosensitive core layer defining a top surface, the photosensitive core layer having an index of refraction $n_c$. One then imagewise exposes the light-transmissive core layer to actinic radiation and develops the photosensitive core layer to remove non-image areas of the photosensitive core layer and not remove image areas of the photosensitive core layer, thus forming a patterned, light-transmissive optical waveguide core having a pair of side walls on the polymeric, buffer layer, and partially revealing an exposed portion of the polymeric, buffer layer; and depositing an overcladding layer onto the top surface of the patterned, light-transmissive optical waveguide core, onto the pair of side walls of the patterned, light-transmissive optical waveguide core, and onto the exposed portion of the polymeric, buffer layer, the overcladding layer having an index of refraction $n_6$, such that $n_b<n_o<n_c$ and $\Delta n=n_c-n_o$.

The present invention involves asymmetrically cladding the core to solve the above problems. Typically, a cladding is formed uniformly around the core. Adding a buffer of index lower than the clad underneath the under clad solves the problem of loss due to light absorption by the substrate as mentioned above. According to this invention, if the underclad is removed, then each of the above problems is solved. The use of a buffer that has a refractive index much lower than that of the core has several benefits. The buffer keeps the tail of the core mode from extending into the substrate, thus keeping the light from leaking into the substrate. The buffer keeps the light from leaking into the substrate, thus eliminating the main reason for polarization dependent loss (PDL) where TM-polarized light can incur significantly higher loss than TE-polarized light. The buffer has a low enough refractive index to keep the light from leaking into the substrate even when heating is performed. When an under clad is not used and a substantially non-photolocking buffer is used, the formation of a secondary waveguide under the core waveguide is avoided when the core is patterned by exposure to radiation. If the waveguide incorporates a grating and an under clad is not used, secondary reflections due to a guide in the under cladding are avoided. If the waveguide incorporates a grating and an under clad is not used, the buffer photolocks just enough to have a grating imprinted in it when the grating is imprinted holographically in the waveguide and allows one to avoid loss of light by coupling to cladding modes. In this case the term holographically imprinted means a grating that is produced in the volume of the material which comprises the waveguide by a periodic modulation in the index of refraction. Such a grating may be contrasted with a surface-relief grating, which is produced by a periodic variation in the topography of the surface of either the core or cladding of the waveguide. In both cases the effect produces a periodic variation in the effective index of refraction along the propagation direction of light within the waveguide.

Additionally, due to the height of the core, the overclad typically has a bump on it that can be quite large. This can occur in polymer waveguides in which polymers must be spin cast from a solvent solution due to their high molecular weight and viscosity. It can also occur in silica waveguides in which chemical vapor deposition of the overclad applies a uniform layer on top of the core. In addition, reactive-ion etching of polymer or glass waveguide cores can result in high propagation losses due to scattering of light caused by rough side walls. Waveguides can be made using photopolymerizable optical materials which can be coated and cured on a substrate. Typically, the materials include mixtures of monomeric and oligomeric components which are blended to provide the correct index of refraction. Mixtures are blended to provide a an between core and clad, of typically 0.5 to 2 percent. In the photolithography of these curing mixtures, typically a guiding region having an index gradient instead of a step index can be formed in the under clad layer. Also, a region can form at the side and the top of the core in which an index gradient is found instead of a step index. The formation of the gradient index in the region surrounding the core is due to migration of dissimilar chemical components, particularly a monomer component moving from the core layer into the cladding layers. In the region directly under the core, the monomers can further react during the formation of the core forming an unwanted guiding region within the under cladding layer. When the underclad region is of about the same thickness as the core, a guiding layer can be formed that penetrates the full thickness of the under clad. In extreme cases it can be as intensely guiding as the core itself and allows light to reach the substrate surface. Since the substrates of this invention are absorbing at optical wavelengths of importance to telecommunications, any portion of the propagating light that reaches the substrate is subject to absorption. Absorption of light by the substrate leads to a severe undesirable polarization-dependent loss of optical power from the propagating signal. Attempts have been made in the art to resolve these issues. One potential solution uses a thick under cladding layer to isolate the core from the substrate to prevent this undesirable result. This eliminates the problem to the desired degree, however, it requires the use of an impracticably thick under cladding. Another solution includes using a buffer region with an index which is 2% or more lower than the core, wherein the buffer region is below the underclad. Even if monomer diffusion occurs deeply through the under clad and slightly into the buffer, the guiding in the buffer will be greatly suppressed, eliminating most light absorption by the silicon. However, the under clad can still guide light and multimode waveguides with residual polarization effects can still result.

One method of lithographically forming optical elements uses an acrylic photoactive composition which is capable of forming a waveguide material upon polymerization. However, this method requires one to utilize polymers with as high a glass transition temperature as possible in order to provide for the greatest operating temperatures. Another method produces waveguides using light-polymerizable compositions such as acrylics having a Tg of at least 100° C. The foregoing waveguides suffer from undesirably high optical loss.

It would be desirable to produce optical devices from polymeric materials which have low absorption and scattering loss at application wavelengths, have precisely controllable refractive indexes for mode and numerical aperture control. Precise refractive index control allows control of mode and numeric aperture and permits fabrication of single mode waveguides that match single-mode fibers in both cross sectional dimensions and numeric aperture. When the core and cladding materials are comprised of two or more miscible monomers, the index at each layer of a waveguide can be precisely tailored by mixing selected pairs of high index and low index monomers. This property can be used to precisely control the mode of a waveguide and can be used to fabricate large-size single-mode waveguides that match commercial single-mode fibers in both cross sectional dimensions and numeric aperture.

In this invention, a planar waveguide structure is formed in which only a buffer, a core, and an overclad are applied to a substrate. A buffer layer is formed on a substrate and cured. A core layer is applied on top of the buffer layer. During the core application and cure, diffusion of low molecular weight, high index of refraction material takes place and increases the index of the buffer. A gradient index is formed through the buffer. The gradient index then sharply falls off with distance into the buffer region. However, the core, cladding and buffer are chosen such that optical multimode behavior is frustrated for all potential values of buffer index. In addition, an overcladding is applied, which coats both the sides and the top of the core. A similar diffusion of high index monomer occurs thereby assuring a gradient index around the core. According to this invention, clear single-mode performance can be combined with exceptionally low coupling loss due to the improved mode matching with round-core single-mode fibers.

The components described in this invention are formed by only three layers on top of the substrate: a buffer layer of index $n_b$; a core layer of index $n_c$; an overclad layer of index $n_o$ with $n_b<n_o<n_c$. In this invention, multi-layer photonic integrated circuit components are fabricated with a core of index $n_c$ surrounded on top by an overclad of index $n_o<n_c$ and at the bottom by a buffer of index $n_b<n_o$, permitting one to achieve low optical loss, low polarization dependent loss, no optical power drop with heating, no secondary waveguide under the core waveguide; no secondary reflections and no (or very low) cladding mode loss in the presence of a volume grating.

DETAILED DESCRIPTION OF THE INVENTION

Figure 1:
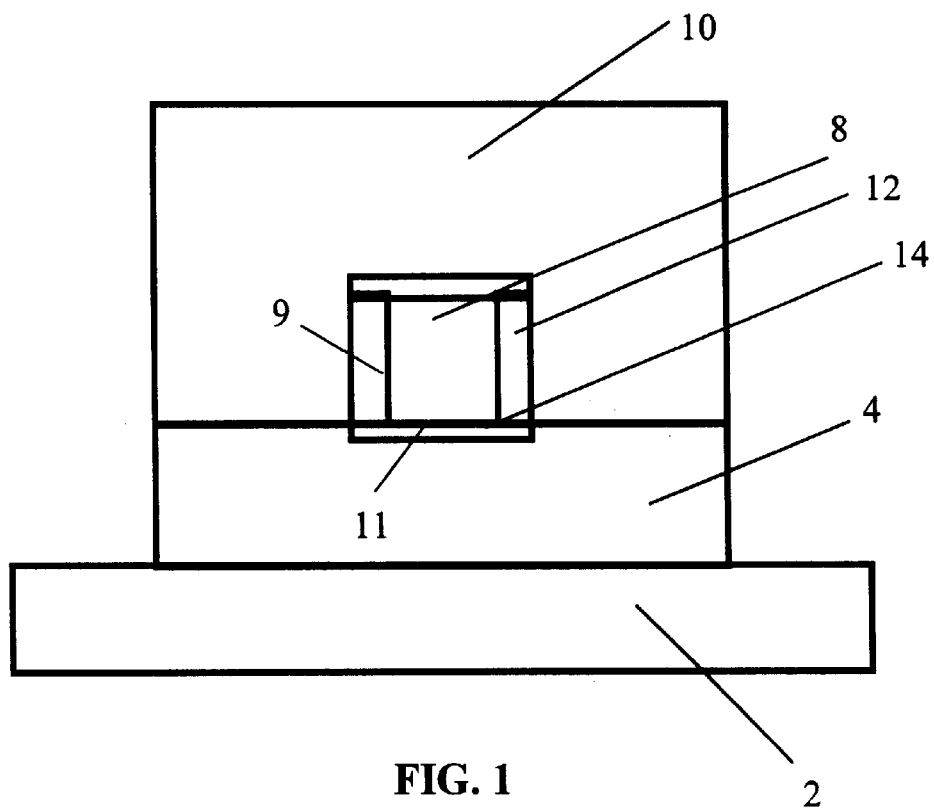
FIG. 1 is a schematic representation of a polymeric waveguide having a buffer layer on a substrate, a core directly on the buffer layer and an overcladding on the top surface of the core, on side walls of the core and on the buffer layer. Side interface regions are between the side walls of the core and the overcladding, a top interface region is between the top of the core and the cladding, and a floor interface region is between a floor of the core and the buffer layer.

The invention provides a single-mode optical waveguide and processes for forming optical waveguides. The waveguide of the invention comprises a substrate 2; a polymeric buffer layer 4 on a surface of the substrate 2; a pattern of a light-transmissive single-mode polymeric core 8 directly on the surface of the buffer layer 4; and a polymeric overcladding layer 10 on a top surface of the core 8 and on side walls 9 of the core 8 and on a portion of the buffer layer 4. An important feature of the invention is that the core 8 has an index of refraction $n_c$ which is greater than an index of refraction of the overcladding layer $n_o$, which is in turn greater than an index of refraction of the buffer layer $n_b$, that is, wherein $n_b<n_o<n_c$ and wherein $\Delta n=n_c-n_o$. Usually the difference between $n_c$ and the index of refraction of the buffer $n_b$ is at least about 1.5 times $\Delta n$.

Referring to FIG. 1, there is shown a schematic representation of a waveguide according to the invention. A polymeric buffer layer 4 is initially deposited onto a surface of a substrate 2. The substrate 2 may be any material on which it is desired to establish a waveguide including materials such as silicon, silicon oxide, gallium arsenide, silicon nitride, glass, quartz, plastics, ceramics, crystalline materials and the like. The substrate 2 may or may not contain other devices, for example, topographical features such as grooves or electrical circuits or electro-optic devices such as laser diodes.

Since the substrates 2 of this invention may be absorbing at optical wavelengths of importance to telecommunications, any portion of the propagating light that reaches the substrate 2 is subject to absorption. Absorption of light by the substrate 2 leads to an undesirable polarization-dependent loss of optical power from the propagating signal. The purpose of an intermediate buffer layer 4 is to restrict the penetration of the light into the substrate 2 and to prevent any significant amount of the light from reaching the substrate 2. In order for the buffer to function as desired it is necessary for its index of refraction to be significantly below that of the core 8. The polymeric buffer layer 4 may be applied in a number of different ways known in the art, such as spin coating, dip coating, slot coating, roller coating, doctor blading, liquid casting or the like. The buffer layer 4 may comprise photopolymerizable compounds, such as acrylate compounds. Useful acrylate compounds are described below. Once the layer of photopolymerizable material is deposited onto the surface of the substrate 2, it is at least partially polymerized by an overall exposure to actinic radiation. Usually the buffer layer 4 has a thickness of from about 3 microns to about 500 microns. Thicknesses of from about 5 microns to about 100 microns are suitable and especially those from about 10 to about 30 microns.

In order to promote adhesion between subsequently applied polymer layers and in some case to control the gradation of index of refraction at the interface, the initially applied layers, including said buffer layer 4, can be purposefully left substantially under-cured in order to promote the interpenetration of monomers and the formation of covalent bonds between layers.

After the buffer layer 4 is deposited and partially polymerized, a core 8 is formed on the surface of the buffer layer 4. In one embodiment, the core 8 is formed by depositing a light-transmissive, single-mode photosensitive core layer onto the surface of the buffer layer 4. A layer of a core photopolymerizable composition is deposited using well known techniques such as spin coating, dip coating, slot coating, roller coating, doctor blading, liquid casting or the like. The photosensitive core layer is then imagewise exposed to actinic radiation and developed, thereby removing non-image areas of the core layer and not removing image areas of the core layer. This process is described in more detail below. After the layer is developed, a patterned, light-transmissive core 8 is formed on the buffer layer 4 and a portion of the buffer layer 4 is partially revealed. The structure of the core 8 at this stage of fabrication is commonly described as a standing rib.

In another embodiment of the invention, the core layer 8 is formed by depositing a pattern of a light-transmissive, polymeric core layer material onto the surface of the buffer layer 4. The core pattern may be produced using well known pattern deposition additive techniques or other subtractive techniques such as reactive-ion-etching. In either embodiment, the core 8 has a cross-sectional width about equal to its cross-sectional height. Usually the core layer 8 has a cross-sectional width and height which each range from about 2 $\mu$m to about 10 $\mu$m, more suitably the core has a cross-sectional width and height which each range from about 5.5 $\mu$m to about 8 $\mu$m. It is also usual that the width of the core 8 is no more than about twice the height of the core, and the height is no more than about twice the width. Further, usually the core 8 is single-mode in each of its width and height and has about the same height and width. Usual waveguide sizes include cores having a height and width which may be equal to one another and both about 2 $\mu$m, about 4 $\mu$m, about 5 $\mu$m, about 6 $\mu$m, about 7 $\mu$m, about 8 $\mu$m, about 9 $\mu$m, or about 10 $\mu$m. It is also usual that the width of the core is no more than about twice the height of the core, and the height is no more than about twice the width. In order to minimize coupling losses to standard single-mode glass fiber, for example to SMF-28 sold by Corning Incorporated, a core cross-sectional dimension between 6×6 microns and 8×8 microns may be used. It is preferred that the core has a cross-sectional width and a cross-sectional height, which together with the value of $\Delta n$ are selected such that the waveguide is single-mode for all optical communication wavelengths greater than about 1300 nm, desirably greater than about 1520 nm. Materials for the core layer 8 include polymerizable acryl ate materials which are described in detail below.

After the core 8 is formed, an overcladding layer 10 is deposited onto a top surface of the core 8, onto side walls 9 of the core 8 and onto the revealed portions of the buffer layer 4. The photopolymerizable overcladding layer 10 may also be applied via the above mentioned techniques and then overall exposed to actinic radiation. The overcladding layer 10 can be any material capable of keeping applied light in the core 8 and may comprise polymerizable acryl ate compounds which are described in detail below. In one embodiment the overcladding layer 10 usually has a thickness measured from the top of the core 8 of from about 3 to about 30, more usually from about 5 to about 20, and more suitably from about 8 to about 15 microns.

The waveguides are formed using photopolymerizable optical materials that include mixtures of monomeric and oligomeric components which are blended to provide a desired index of refraction for each layer. The particular index of refraction for each layer has a significant effect on the performance of the waveguide. When selecting the photopolymerizable compounds to be used in each of the core 8, buffer 4 and overcladding 10 layers, it is important that the core 8 has an index of refraction $n_c$ which is greater than an index of refraction of the overcladding layer $n_o$ and wherein $\Delta n = n_c - n_o$, and wherein the difference between $n_c$ and the index of refraction of the buffer $n_b$ is at least about 1.5 times $\Delta n$. More usually, the difference between $n_c$ and $n_b$ is at least about 2 times $\Delta n$. Most suitably, the difference between $n_c$ and $n_b$ is at least about 3 times $\Delta n$. In one embodiment of the invention, the $\Delta n$ ranges from about 0.0031 to about 0.079.

In the usual applications of the invention, the waveguiding structures produced are single-mode. Ensuring that a waveguide will be single-mode entails maintaining a certain relationship between the physical cross-sectional size and shape of the waveguide and the value of $\Delta n$. Generally if the dimension of the waveguide is held fixed, then there is a maximum (cutoff) value of $\Delta n$ that can not be exceeded if the waveguide is to be single-mode. Similarly, if the value of $\Delta n$ is held fixed, then there is a maximum cross-sectional dimension for the waveguide that can not be exceeded, if the waveguide is to be single-mode. As an illustration, the Table below presents the relationship between size and the maximum permitted value of $\Delta n$ for the common case of a waveguide possessing a square cross-section. Lastly, in order to maximize the coupling efficiency of the waveguide and to minimize light propagation losses in bends, it is generally desirable to employ a value of $\Delta n$ that is approximately equal to but not in excess of the cutoff value.

TABLE

| Waveguide Core Dimension ($\mu$m) | Cutoff value of $\Delta n$ for wavelength = 1.55 microns |
| --- | --- |
| 2 × 2 | 0.079 |
| 4 × 4 | 0.019 |
| 6 × 6 | 0.0086 |
| 7 × 7 | 0.0064 |
| 8 × 8 | 0.0049 |
| 10 × 10 | 0.0031 |

Generally, the refractive index $n_c$ of the core 8 is in the range of from about 1.33 to about 1.7, or more usually from about 1.4 to about 1.55. Generally the overcladding has a refractive index $n_o$ in the range of from about 1.3 to about 1.65, or more usually from about 1.35 to about 1.55. It is also important to select to select compounds that produce a buffer layer 4 having a refractive index $n_b$ less than those of the core material and the overcladding layer. Usually the buffer 4 has a refractive index in the range of from about 1.3 to about 1.55, or more suitably from about 1.3 to about 1.4. These measure of refractive index are measured at 1550 nm.

In the photolithography of these mixtures, it is common for the monomeric component of the core 8 to migrate into the buffer layer 4, forming a floor interface region 14 between a floor 11 of the core 8 and the buffer layer 4, the floor interface region 14 having an index of refraction $n_f$, and a side interface region 12 between the side walls 9 of the core 8 and the overcladding layer 10, the side interface region 12 having an index of refraction $n_s$. These interface regions 12 and 14 can be seen in FIG. 1. These interface regions 12 and 14 have a gradient index rather than a step index. The interface regions 12 and 14 are formed because the monomers of the core 8, the overcladding 10 and the buffer 4 can diffuse out of their respective regions and intermix at their boundaries. As a result of subsequent exposure to actinic radiation as the core and then the overclad are cured these regions of intermixing become permanently fixed. The extent of interdiffusion of core 8, overcladding 10, and buffer 4 monomers depends on the degree of cure of buffer 4, overcladding 10 and core 8, on the temperature and diffusivity of the monomers employed, and the time of contact between uncured or partially cured layers before the full waveguide structure is hard cured in a final step. Interdiffusion of monomers is greatest at the bottom and sides of the core 8 because these regions are typically less cured during the intermediate fabrication steps. This low degree of cure is caused in the case of the core-buffer interface by a desire to promote bonding between core 8 and the buffer 4, and in the case of the sides of the core by a reduction in cure dose at the edges caused by diffraction effects in mask-based lithography or by beam profile intensity variation for laser direct-write fabrication techniques.

Figure 2:
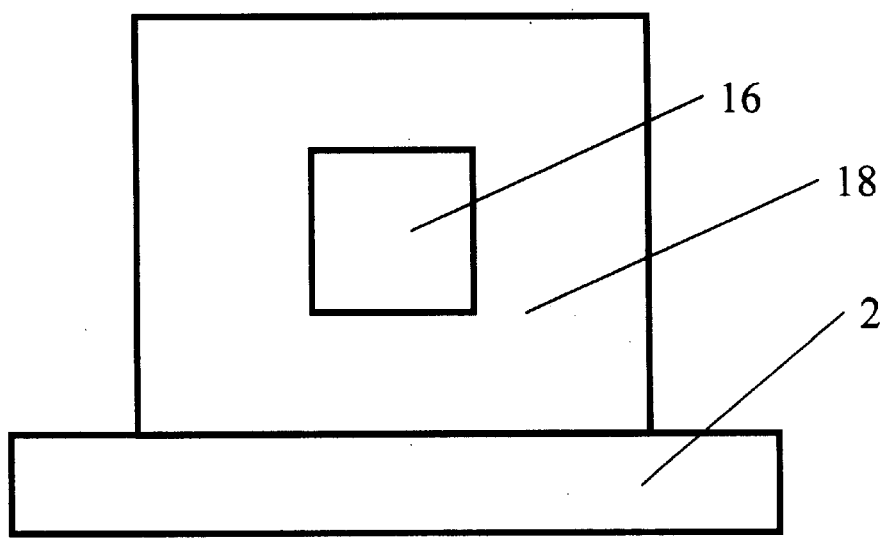
FIG. 2 is a schematic representation of waveguide having an ideal step index structure.
Figure 3:
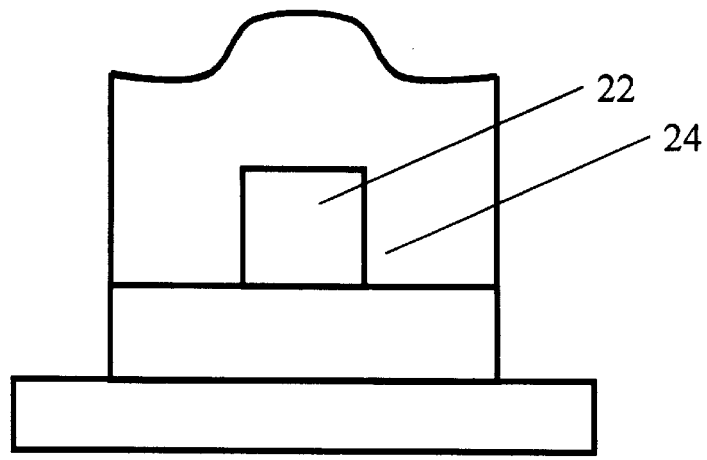
FIG. 3 is a schematic representation of prior art waveguide having a normal step index structure.
Figure 4A:
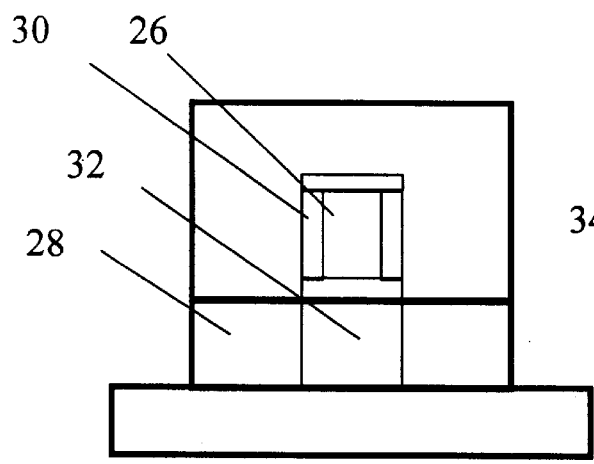
FIG. 4(a) is a schematic representation of a prior art waveguide fabricated from photopolymer having an under clad, and a gradient index region around the core including a guiding region in the under clad.
Figure 4B:
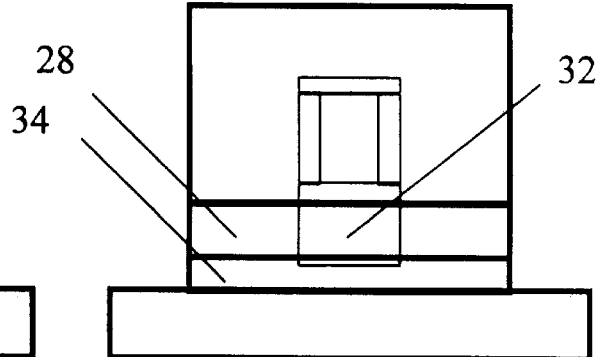
FIG. 4(b) is a schematic representation of a prior art waveguide having an under clad, a guiding region in the under clad, and a gradient index at the sides and top of the core, and a low index buffer beneath the under clad.

As seen in FIG. 2, an ideal waveguide having ideal performance is shown. Ideally, light would be transmitted through an ideal core 16 with no diffusion of core components into surrounding ideal overcladding 18 and zero light absorbed into substrate 2. However, in reality, conventional prior art waveguides look more like the one shown in FIG. 3, where an overcladding 24 has a bump due to the height of the core 22. This bump is undesirable and disadvantageous. FIGS. 4(a)–4(b) also show disadvantageous waveguides of the prior art. FIG. 4(a) shows a waveguide having a high refractive index guiding region 32 being formed in an under cladding 28. Guiding region 32 extends through the under cladding and to the substrate 2 where a significant amount of light may leak and be absorbed. FIG. 4(b) shows a waveguide having a low index buffer layer 34 below an under clad 28 in an effort to prevent guiding region 32 from reaching the substrate. Because guiding light still leaks into the region 32 below the core 26. waveguides of this type have high coupling loss due to a poor match between the shape of the mode for the waveguide and the shape of the mode for conventional fiber. The present invention reduces the problems of the prior art, limiting the loss caused by these guiding regions by eliminating the under cladding layer and employing a buffer layer with the refractive indexes as described herein.

Generally, the side interface 12 has a refractive index $n_s$ which is about equal to the floor interface 14 refractive index $n_f$. In one embodiment of the invention, $n_s$ is a graduated index of refraction which decreases from about $n_s$ at the portion of the side interface region closest to the side walls 9 of the core to about $n_o$ at the portion of the side interface region 12 closest to the overcladding 10. In another embodiment of the invention, nf is a graduated index of refraction which decreases from about $n_c$ at the portion of the floor interface region 14 closest to the floor 11 of the core 8 to about $n_b$ at the portion of the floor interface region 14 closest to the buffer layer 4. It is also desired that the graduated index of refraction $n_s$ is about the same, i.e. about matches the graduated index of refraction $n_f$. This means the change in index per unit length of medium traversed and the same starting and stopping values.

The compositions used to form each of the buffer 4, overcladding layer 10 and core 8 each may comprise a photopolymerizable compound and a photoinitiator. The photopolymerizable compound may be a monomer, oligomer or polymer which is an addition polymerizable, non-gaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. They are selected such that the formed polymerized element has the desired refractive index as described above. The determination of the refractive index for the particularly selected polymerized compositions are easily determinable by those skilled in the art.

Multifunctional acryl ate monomers are suitable. The generalized structure of the multifunctional acrylates is given below:

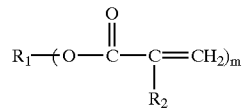

For the core, m may range from 1 to about 6; $R_2$ is H or $CH_3$, and $R_1$ is a linkage of aliphatic, aromatic or aliphatic and aromatic mixed organic molecular segments. Suitably $R_1$ is an alkylene, alkylene oxide, arylene oxide, aliphatic polyether or polyester moiety and $R_2$ is preferably H. To ensure solvent resistance of the film and high contrast photolithography, crosslinked polymers and therefore multifunctional acryl ate monomers (m≧2) are suitable. It is also desirable to reduce stress induced scattering optical loss of the final waveguiding device by using flexible, low glass transition temperature (Tg) polymers. It is known in the art that glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with 1≦m≦3, ideally m=2, and long linkage segments between two ethylenically unsaturated functionalities are useful. For this invention, long linkage segments are those which have an average molecular chain length of at least about 4 carbon atoms or larger and suitably 6 or larger. Suitable flexible linkage structures include alkylenes with chain length larger than about 3 carbon atoms, poly(ethylene oxide), poly (propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photo-polymerize or add undue loss at the light wavelengths of interest, e.g., wavelengths of 1.31 and 1.55 microns for telecommunications. Suitable substitutes nonexclusively include alkyl, aryl, alkoxy and sulfoxide groups, etc. To ensure high resistance to thermal degradation and discoloration, thermally stable molecular structures of $R_1$ are suitable. Such $R_1$ segments should be free of thermally susceptible moieties such as aromatic urethane and amide groups. To ensure low birefringence, $R_1$ linkages with low stress optic coefficient and optical polarizability are usual.

For the overcladding layer, the acryl ate is also as described above, however, the average molecular chain length between ethylenically unsaturated functionalities may be about 6 carbon atoms or longer, usually 8 or longer and more suitably 12 or longer. Suitable flexible linkage structures include alkylenes with chain length larger than 6 carbon atoms, poly(ethylene oxide), poly(propylene oxide) and ethoxylated bisphenol A.

In an embodiment of the invention, materials for each the buffer 4, core layer 8 and overcladding layer 10 also include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Multifunctional acryl ate oligomers include, but are not limited to acrylated epoxies, acrylated polyurethanes and acrylated polyesters. Photopolymerizable compounds include aryl acrylates. Illustrative of such aryl acryl ate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. The aryl acryl ate monomers may be multifunctional aryl acrylates and more usually aryl acryl ate monomers are di, tri and tetra acrylates based on the bisphenol-A structure. Usual aryl acryl ate monomers are alkoxylated bisphenol-A diacrylates such as ethoxylated bisphenol-A di-acryl ate, propoxylated bisphenol A diacrylates and ethoxylated hexafluorobisphenol-A diacrylates. The aryl acrylate monomers of choice are ethoxylated bisphenol-A diacrylates. Desired polymerizable components are monomers having the structure (I):

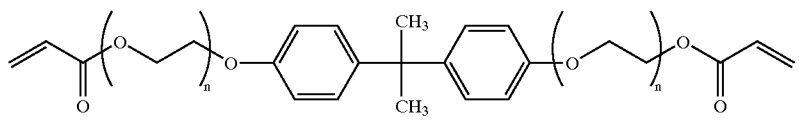

In one embodiment, for the core, n is about 10 or less, usually about 4 or less and more suitably about 2 or less. In one embodiment, for the cladding layers, n is about 2 or more, usually about 4 or more and more suitably about 10 or more. Also useful are acryl ate containing copolymers which are well known in the art. In an embodiment, the cladding layer comprises a polymerizable component which has the ethoxylated bisphenol-A disacrylate structure (I) shown above wherein $1 \leq n \leq 20$, usually $4 \leq n \leq 15$, and more suitably $8 \leq n \leq 12$.

The polymerizable compositions may be multifunctional fluorinated (meth)acrylates, particularly those based on the following structures:

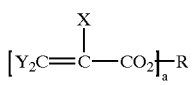

Where Y is H or D; X is H, D, F, Cl, or $CH_3$, and a is an integer from 2 to 4

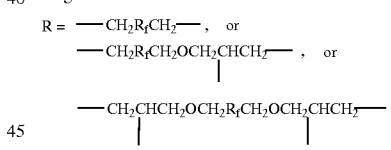

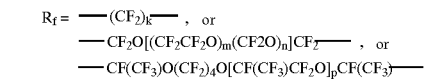

Where k, m, n, and p are integers

These materials produce waveguides with propagation losses of as little as 0.17 dB/cm at 1550 nanometers. The glass transition temperatures (Tg) of these materials can be easily selected to be below the operating temperature of thermo-optic devices. Low Tg versions of these materials have been shown to have negligible birefringence by grating assisted measurements, and to possess a high value of the temperature derivative of refractive index, which allows the fabrication of power efficient thermo-optic devices such as optical switches and tunable gratings. Useful fluorinated (meth)acrylates include. For example a tetraacrylate F60TA made from the polyol, Fluorolink® T, which is commercially available from Ausimont S.p.A. of Milan ITALY according to the reaction which is shown below:

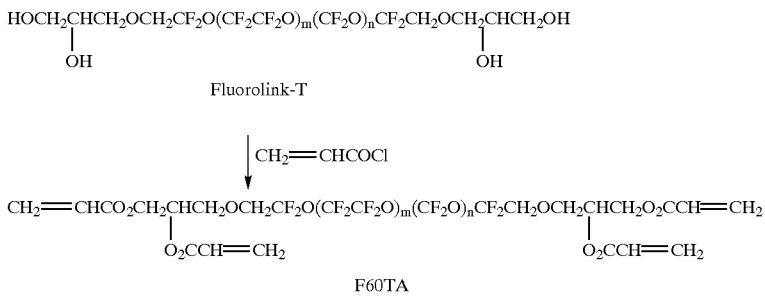

Fluorolink-T

↓ CH₂=CHCOCl

F60TA

Other multifunctional acrylates include C6DIACRY From Akzo Chemicals B.V. of Amersfoort Netherlands:

L-12043 from the 3M Company of Saint Paul, Minn.:

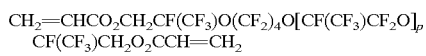

L-9367 similarly from the 3M Company:

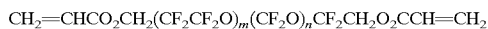

Although each of the buffer, overcladding and core may be comprised of structurally similar compositions, in order for each of the buffer, and overcladding to have a refractive index which is lower than the refractive index of the core, they must have different chemical compositions for any individual application. For example, the buffer layer composition may have a similar Tg property as the cladding layer, but need not be the identical composition. The photopolymerizable materials and processing conditions are selected such that the Tg of the polymerized buffer ranges from about 60° C. or less, usually about 40° C. or less and more suitably about 25° C. or less.

It is a feature of the present invention that the photopolymerizable compounds to be used in the waveguide core produce a core which after polymerization has a glass transition temperature of about 80° C. or less and suitably about 50° C. or less. It is a feature of the present invention that the photopolymerizable compounds to be used in the waveguide cladding layer produce a cladding layer which after polymerization have a glass transition temperature of about 60° C. or less, usually about 40° C. or less and more suitably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each overall photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light-transmissive element of light-transmissive devices may be used. The amount of photopolymerizable compound is generally used in an amount of from about 35 to about 99.9% by weight of the composition. Usually the photopolymerizable compound is present in the overall composition in an amount of from about 80% to about 99.5% by weight, and more suitably from about 95 to about 99% based on the weight of the overall composition.

Each light-sensitive composition further comprises at least one free radical generating photoinitiator which photolytically generates free radicals. Usually the photoinitiator is a free radical generating addition polymerization initiator activated by actinic light and is thermally inactive near room temperature (e.g. from about 20° C. to about 80° C.) Any photoinitiator which is known to photopolymerize acrylates can be used. Photoinitiators nonexclusively include quinoxaline compounds; vicinal polyketaldonyl compounds, alpha-carbonyls; acyloin ethers; triarylimidazolyl dimers; alpha-hydrocarbon substituted aromatic acyloins; polynuclear quinones; and s-triazines as are known in the art.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Photoinitiators include 1-hydroxycyclohexylphenyl ketone (Irgacure® 184), benzoin, benzoin ethyl ether, benzoin isopropyl ether, benzophenone, benzodimethyl ketal (Irgacure 651), 2,2-diethyloxy acetophenone, 2-hydroxy-2-methyl-1-phenylpropan-1-one (Darocur® 1173), available from E. Merck of Darmstadt, Germany; 1-[4-(2-hydroxyethoxy)phenyl)]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)phenyl]phenylmethanone (Quantacure® BMS) from Great Lake Fine Chemicals Limited Of London, England, and di-campherquinone. The most suitable photoinitiators are those which tend not to yellow upon irradiation. Such photoinitiators include benzodimethyl ketal (Irgacure® 651), 2-hydroxy-2-methyl-1-phenylpropan-1-one (Darocur® 1173), 1-hydroxy-cyclohexyl-phenyl ketone (Irgacure® 184), and 1-[4-(2-hydroxyethoxy)phenyl]-2-hydroxy-2-methyl-propan-1-one (Darocur 2959). Fluorolink®-T and C6DIACRYL are sufficiently miscible that conventional photoinitiators can be used for UV curing. For the more highly fluorinated multifunctional acrylates, such as materials L-12043 and L-9367 from 3M, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and more suitably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, titania, glass spheres and the like (especially when in the nanoscale regime, that is, having a particle size less than about 100 nm), dyes, free radical scavengers, contrast enhanhancers, nitrones and UV absorbers. Antioxidants include such compounds as phenols and particularly hindered phenols including Irganox® 1010 from Ciba-Geigy Corporation Corporation of Tarrytown N.Y.; sulfides; organoboron compounds; organophosphorous compounds; N,N'-hexamethylenebis(3,5-di-tert-butyl-4-hydroxyhydrocinnamamide) available from Ciba-Geigy under the tradename Irganox® 1098. Photostabilizers and more particularly hindered amine light-stabilizers stabilizer include but are not limited to poly[(6-morpholino-s-triazine-2,4-diyl)[(2,2,6,6,-tetramethyl-4-piperidyl)imino]-hexamethylene[(2,2,6,6,-tetramethyl-4-piperidyl)imino)] available from Cytec Industries of Wilmington, Del. under the tradename "Cyasorb® UV-3346." Volume expanding compounds include such materials as the spiral monomers known as Bailey's monomer. Examples of dyes include methylene green, methylene blue, and the like. Suitable free radical scavengers include oxygen, hindered amine light-stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and usually from about 0.1% to about 1%. All components of the overall composition are in admixture with one another, and most suitably in a substantially uniform admixture.

Once the core photosensitive composition is formed onto the buffer layer 4 in a thin or thick film, actinic radiation is directed onto the film in order to delineate the core layer. That is, the position and dimensions of the core is determined by the pattern of the actinic radiation upon the surface of the core layer. The radiation pattern must be chosen so that the photopolymerizable composition is polymerized in the desired pattern and so that other regions of the film remain unreacted. The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may vary widely, and any conventional wavelengths and sources can be used. In one embodiment, the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Alternatively, the processing can utilize a multiphoton process initiated by a high intensity source of actinic radiation such as a laser. It is also possible to cure the above fluorinated monomers without photoinitiators through the use of electron beam curing. Electron beam or ion beam excitation may be utilized. Exposure time normally varies from a few seconds to about 10 minutes. Temperatures usually range from about 10° C. to about 60° C., however, room temperature is more suitable. Additionally, these materials could be cured thermally through the use of peroxides or other thermal initiators.

Control of the spatial profile of the actinic radiation, that is, where it falls on the layer of photopolymerizable material may be achieved by conventional methods. For example, in one conventional method, a mask bearing the desired core pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the core pattern onto the film. Another conventional method of spatial control is to use a source of actinic radiation which comprises a directed or focused beam such as a laser or electron beam. Such a beam intersects only a small area of the photo-polymerizable material film surface. The pattern of the desired core is achieved by moving this small intersection point around on the film surface either by scanning the beam in space or by moving the substrate so that the intersection point is changed relative to a stationary beam. These types of exposure using a beam source are known in the art as direct-write methods. The precise cross-sectional shape of the waveguide core and the width and degree of the graded index region formed at the sides of the core is influenced by the degree of collimation of the light source for both direct-write and mask exposure methods of fabrication. Depending on the desired result the degree of collimation may vary widely. It is generally suitable, to use a relatively highly collimated source for the definition of the waveguide core structure. Collimation to within and angle of less than 10 degrees is useful.

After the photopolymerizable composition of the core layer has been polymerized to form the predetermined pattern of the core layer, the pattern is then developed to remove the nonimage areas and leave behind the predetermined pattern. Any conventional development method can be used, for example, flushing with a solvent for the unirradiated composition. Such solvents include polar solvents, such as alcohols and ketones. Useful solvents are acetone, ethanol, propanol, tetrahydrofuran and ethyl acetate, and for highly fluorinated monomers fluoroether solvents such as those sold by Ausimont under the tradename "Galden®" are suitable.

The buffer and cladding layer need not be fully cured, but only partially polymerized. Partially polymerized means that some acryl ate groups are present after polymerization, i.e., not all acrylates are converted to saturated hydrocarbons. This means that more than 0% of the number of acryl ate groups, usually more than about 10%, and most suitably more than about 25% of the acryl ate groups remain unreacted. The upper limit on the number of unreacted groups depends on the gel point of the monomer(s), which in turn depends on the functionality (the number of acryl ate groups per monomer). If the functionality equals an integer, f, then the upper limit for unreacted groups is sufficient to cause gelation and is approximately given by the relation (1–1/f) *100%. As an illustration, the number of remaining unreacted groups for a tetra-acryl ate monomer be less than 75%, and the number of remaining unreacted groups for a diacrylate monomer be less than 50%. Partial polymerization of the layers prior to application of the next successive layer allows the layers to intermingle at their interface. This intermingling improves adhesion of the layers and can in some cases be used to control the gradation of index of refraction at the interface.

Figure 6:
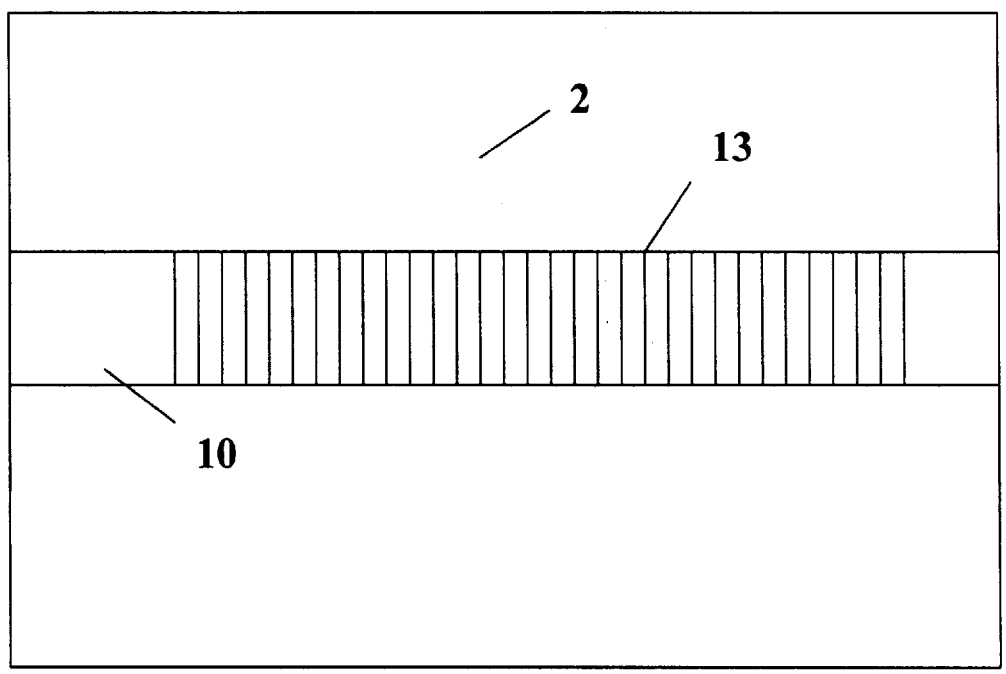
FIG. 6 is a plan view of a waveguide on a substrate in which the waveguide has been impressed with a grating.

After each layer has been applied and optionally patterned or impressed with a surface or volume diffraction grating or the like, any remaining unpolymerized acrylates are subjected to a hard curing by a blanket or overall exposure to actinic radiation such that they are substantially fully polymerized. A diffraction grating 13 is shown in FIG. 6. The cure dose (total radiant energy per unit square of surface) for the final cure step is typically from about 10 to about 500 times the dose employed to partially cure each layer during the preceding fabrication steps. Most suitably the final cure dose is about 100 times this intermediate dose. In this manner, the layers intermix at their interfaces during the early fabrication steps and can be mixed in any desired proportions to fine tune the refractive indices of the layers and the overall device and insure good adhesion between the layers by covalent bonding. Ultimately the desired structure is locked in with the final curing step, so that no further evolution of the structure may take place. In order to make planar polymeric optical waveguides, it is necessary to finely control the refractive index of various core and cladding layers. This can be achieved by tailoring the structure of the monomer used in a particular coating layer to achieve the desired refractive index. In practice, it is easier to blend several miscible monomers of different refractive indexes together to get the desired refractive index needed. When strongly reflecting gratings are required, it is also suitable to employ more than one monomer in the core and optionally in the cladding.

In addition to making planar waveguides using the lithographic method presented, it may also be possible to make waveguide cores by reactive ion etching), by microreplication, by direct laser writing, or by laser ablation.

Flexibility of the materials allows for fabrication of devices with desired mechanical robustness. Cracking is also avoided even when the device is exposed to very high or very low temperatures. Good adhesion of the materials permits fabrication of robust devices on a variety of substrates without delamination even in some harsh environments such as high temperature and high humidity. Compatibility of device fabrication techniques with semiconductor industry practices allows for development of hybrid optoelectronic circuitry.

Figure 5:
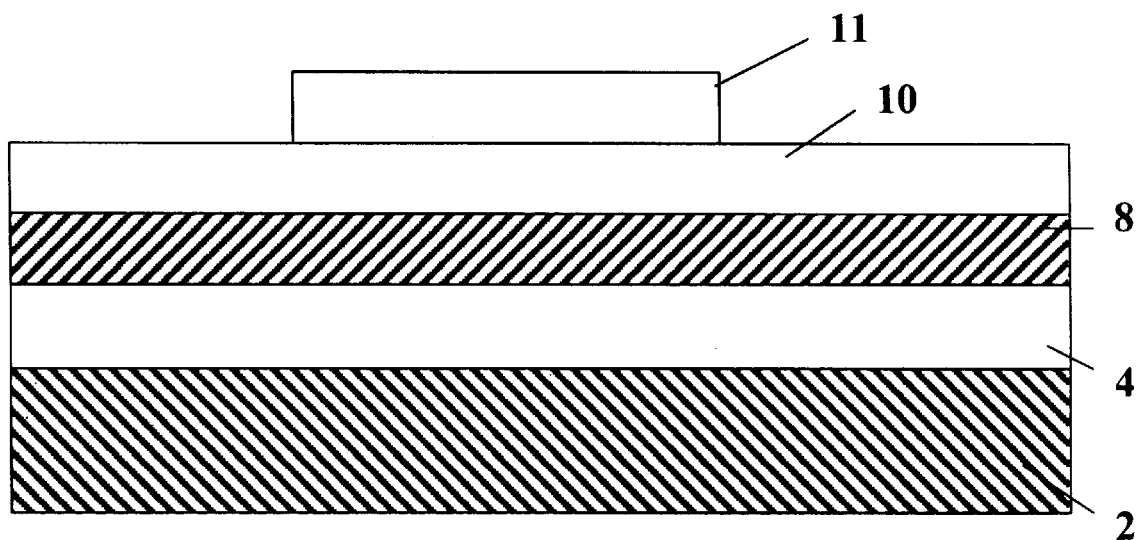
FIG. 5 is a cross sectional view of a waveguide having a heater attached to the overcladding.

Waveguides of the present invention may have any of a number of convenient cross-sectional shapes, such as circular, polygonal, square, rectangular, trapezoidal, and rounded such as following a parabolic or Gaussian curve on the top and sides and flat at the bottom where they contact the buffer. An aspect of the invention that is of particular utility is its application to thermooptic devices. These devices function by using the fact that index of refraction for most materials is a function of temperature. For polymers the change in index of refraction with respect to temperature (dn/dT) is negative and large with respect to most inorganic materials. Specific contemplated devices include optical switches and tunable filters based on gratings. It is common practice to use a heater on the top surface of the polymer stack, that is, on or above the uppercladding layer. The device is typically built on a substrate composed of a material that possesses a high thermal conductivity with respect to the polymer, for example, a silicon wafer. Applying power to the heater therefore establishes a thermal gradient wherein the polymer layer at the top is hotter than the polymer layers below. A heater 11 is shown in FIG. 5 attached to an overcladding. Because the value of dn/dT is negative, the index of refraction at the top of the polymer stack becomes less than the index at the bottom. This gradient in index tends to push the light propagating in any waveguide exposed to this gradient down toward the substrate. In devices such as switches and tunable gratings such a downward displacement of the light is undesirable. In the case of a switch the desired displacement is lateral, and in the case of the grating the desired displacement is none. The structure of the waveguide in the present invention acts to limit the motion of the light (mode) in the downward direction. This is accomplished by the fact that the low index buffer is brought into close proximity to the core of the waveguide. The influence of the buffer (provided $n_c-n_b>1.5*\Delta n$) will overcome the tendency for the mode to be pushed down toward the substrate. The improved waveguide geometry of the present invention leads to lower loss and less polarization dependence for devices such as switches and wavelength tunable gratings.

The following non-limiting examples serve to illustrate the invention.

EXAMPLE 1

A silicon wafer is cleaned and then silane treated to provide adhesion to acryl ate formulations. The treated wafer is spin coated with a layer of buffer material comprising a 75:25 weight percent fluorinated diacrylate/ fluorinated tetraacrylate blend with a photoinitiator. The buffer layer is then partially cured by an overall exposure to actinic radiation. The buffer layer is then spin coated with a layer of core material comprising a 92:8 weight percent fluorinated tetraacrylate/fluoroalkyl acryl ate having 8 fluorine atoms, blended with a photoinitiator. This material has been chosen such that it has a higher refractive index than the buffer layer. The thickness of the core layer depends on the desired height of the waveguide, which typically ranges from 5 to 9 microns for single mode guides. The core material is then exposed to UV light through a mask. The core exposure dose is adjusted to achieve the desired width of the core and the desired degree of adhesion of the surrounding cladding. The unexposed material is then developed away with solvent. The core is then spin coated with a layer of overcladding material comprising fluorinated tetraacrylate blended with a photoinitiator. The overcladding layer is then cured by a final dose, which penetrates to all layers and completes the cure of the top layer as well as the underlying layers.

EXAMPLE 2

A mixture comprising 25 weight percent (wt %) of a fluorinated tetraacrylate F60TA, 75 wt % of a fluorinated diacrylate L-9367 are blended with 2 wt % of a fluorinated photoinitiator to form a homogeneous solution. The solution was then spin coated onto a silicon substrate and cured under a high-pressure mercury-xenon lamp at an irradiance of about 15 mW/cm² to form a 10 μm thick buffer. The buffer has a refractive index of 1.313. A core mixture comprising 92 wt % of a fluorinated tetraacrylate F60TA, 7 wt % of a fluorinated diacrylate "C6DIACRY" are blended with 1 wt % of photoinitiator, Darocure® 1173, to form a homogeneous solution. The core solution was then coated onto the buffer layer. It was exposed through a photomask to a mercury-xenon lamp and developed to form a 6-μm thick core having a refractive index of 1.336.

An overcladding composition comprising 99 wt % of a fluorinated tetraacrylate F60TA and 1 wt % of photoinitiator, Daracure® 1173, were blended to form a homogeneous solution. The solution was then spin coated over the core and cured under a mercury lamp to form a 12-μm thick overcladding having a refractive index of 1.329.

While the present invention has been particularly shown and described with reference to suitable embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A single-mode optical waveguide fabricated on a substrate, the substrate defining a surface, the single-mode optical waveguide comprising:
    a polymeric, buffer layer disposed on the surface of the substrate, the polymeric, buffer layer defining a surface and having an index of refraction $n_b$;
    a patterned, light-transmissive core layer disposed directly on the surface of the buffer layer, the patterned, light-transmissive core layer defining a top surface and a pair of side walls, the patterned, light-transmissive core layer having an index of refraction $n_c$;
    an overcladding layer disposed on the top surface of the core, the pair of side walls of the core, and the buffer layer, the overcladding layer having an index of refraction $n_o$, such that $n_b < n_o < n_c$ and $\Delta n = n_c - n_o$, wherein the value of $\Delta n$ produces a single-mode waveguide at optical communication wavelengths;
    a side interface region between each of the pair of side walls of the patterned, light-transmissive core layer and the overcladding layer, the side interface region having an index of refraction $n_s$; and
    a floor interface region disposed between the floor of the patterned, light-transmissive core layer and the polymeric, buffer layer, the floor interface region having an index of refraction $n_f$;
    wherein at least one of the side interface region and floor interface region comprises an intermingling of material from the light transmissive core and material from either the overcladding layer or the polymeric buffer layer.

2. The single-mode optical waveguide of claim 1 wherein the core has a cross-sectional width and a cross-sectional height, and wherein the core cross-sectional width and cross-sectional height together with the value of $\Delta n$ are selected such that the waveguide is single-mode for all optical communication wavelengths greater than about 1300 nm.

3. The single-mode optical waveguide of claim 1 wherein the core has a cross-sectional width and a cross-sectional height, and wherein the core cross-sectional width and cross-sectional height together with the value of $\Delta n$ are selected such that the waveguide is single-mode for all optical communication wavelengths greater than about 1520 nm.

4. The single-mode optical waveguide of claim 1 wherein the difference between the index of refraction $n_c$ of the patterned, light-transmissive core layer and the index of refraction $n_b$ of the polymeric, buffer layer is at least about 1.5 times $\Delta n$.

5. The single-mode optical waveguide of claim 1 wherein the difference between $n_c$ and $n_b$ is at least about 2 times $\Delta n$.

6. The single-mode optical waveguide of claim 1 wherein the difference between $n_c$ and $n_b$ is at least about 3 times $\Delta n$.

7. The single-mode optical waveguide of claim 1 wherein the thickness of the polymeric, buffer layer is at least about 3 microns.

8. The single-mode optical waveguide of claim 1 wherein $\Delta n$ ranges from about 0.0031 to about 0.079.

9. The single-mode optical waveguide of claim 1 wherein the patterned, light-transmissive core layer has a cross-sectional width and height which each range from about 2 μm to about 10 μm.

10. The single-mode optical waveguide of claim 1 wherein the patterned, light-transmissive core layer has a cross-sectional width and a height which each range from about 2 μm to about 10 μm, and wherein the cross-sectional width is no more than about twice the height and the height is no more than about twice the cross-sectional width.

11. The single-mode optical waveguide of claim 1 wherein the patterned, light-transmissive core layer has a cross-sectional width and a height which each range from about 6 μm to about 8 μm.

12. The single-mode optical waveguide of claim 1 wherein the patterned, light-transmissive core layer has a cross-sectional width and a cross-sectional height, the cross sectional width being about equal to the cross-sectional height, and wherein the cross-sectional width and the cross-sectional height are each selected from the group of dimensions consisting of about 2 μm, about 4 μm, about 5 μm, about 6 μm, about 7 μm, about 8 μm, and about 10 μm.

13. The single-mode optical waveguide of claim 1 wherein the patterned, light-transmissive core layer has a height and a width, and the patterned light-transmissive core layer is single moded in each of the width and the height.

14. The single-mode optical waveguide of claim 1 wherein $n_s$ is about equal to $n_f$.

15. The single-mode optical waveguide of claim 1 wherein $n_s$ decreases from about $n_c$ at a portion of the side interface region closest to an adjacent one of the pair of side walls of the patterned, light-transmissive core layer to about $n_o$ at a portion of the side interface region closest to the overcladding layer.

16. The single-mode optical waveguide of claim 1 wherein $n_f$ decreases from about $n_c$ at a portion the floor interface region closest to the floor of the patterned, light-transmissive core layer to about $n_u$ at a portion of the floor interface region closest to the polymeric, buffer layer.

17. The single-mode optical waveguide of claim 1 wherein $n_s$ decreases from about $n_c$ at a portion of the side interface region closest to an adjacent one of the pair of side walls of the patterned, light-transmissive core layer to about $n_o$ at a portion of the side interface region closest to the overcladding; and $n_f$ decreases from about $n_c$ at a portion of the floor interface region closest to the floor of the patterned, light-transmissive core layer to about $n_u$ at a portion of the floor interface region closest to the polymeric buffer-layer.

18. The single-mode optical waveguide of claim 17 wherein the graduated index of refraction $n_s$ about matches the graduated index of refraction $n_f$.

19. A micro-optoelectronic device which comprises:

the waveguide of claim 1; and a heater disposed on the top surface of the overcladding layer.

20. A micro-optoelectronic device which comprises:

the waveguide of claim 1; and a surface-relief or volume grating patterned into at least one of the polymeric, buffer layer, the patterned, light-transmissive core layer, or the overcladding layer.

21. A method for forming a single-mode optical waveguide on a substrate, the substrate defining a surface, the method comprising the steps of:

depositing a polymeric, buffer layer onto the surface of the substrate, the polymeric, buffer layer defining a surface and having an index of refraction $n_b$;

depositing a patterned, light-transmissive core layer directly onto the surface of the polymeric, buffer layer without any intermediate layers, the patterned, light-transmissive core layer defining a core having a top surface and a pair of side walls, the patterned, light-transmissive core layer having an index of refraction $n_s$; and depositing a overcladding layer onto the top surface of the patterned, light-transmissive core layer, the side walls of the patterned, light-transmissive core layer, and a portion of the polymeric, buffer layer, the overcladding layer having an index of refraction $n_o$, such that $n_b<n_o<n_c$ and $\Delta n = n_c - n_o$;

wherein at least a portion of the light-transmissive material of the core layer intermingles with the buffer layer, thus forming a floor interface region between a floor of the core and the buffer layer, the floor interface region having an index of refraction $n_f$, and also forming a side interface region between the side walls of the core and the overcladding layer, the side interface region having an index of refraction $n_s$.

22. A method for forming a single-mode optical waveguide on a substrate, the substrate defining a surface, the method comprising the steps of:

depositing a buffer layer onto the surface of the substrate, the buffer layer being fabricated from a polymeric, material having an index of refraction $n_b$, the buffer layer defining a surface;

depositing a core layer directly onto the surface of the buffer layer without any intermediate layers, the core layer being fabricated from a light-transmissive material having an index of refraction $n_c$;

patterning the core layer to define a core with a top surface and a pair of side walls and to expose portions of the buffer layer; and depositing an overcladding layer onto the top surface of the core layer, the side walls of the core layer, and the exposed portions of the buffer layer, the overcladding layer having an index of refraction $n_o$, such that $n_b<n_o<n_c$ and $\Delta n = n_c - n_o$, wherein the value of $\Delta n$ produces a single-mode waveguide at optical communication wavelengths;

wherein at least a portion of the light-transmissive material of the core layer intermingles with the buffer layer, thus forming a floor interface region between a floor of the core and the buffer layer, the floor interface region having an index of refraction $n_f$, and also forming a side interface region between the side walls of the core and the overcladding layer, the side interface region having an index of refraction $n_s$.

23. A method for forming an optical waveguide on a substrate, the substrate defining a surface, the method comprising the steps of:

depositing a polymeric, buffer layer onto the surface of the substrate, the polymeric, buffer layer defining a surface and having an index of refraction $n_b$;

depositing a photosensitive core layer directly onto the surface of the polymeric, buffer layer without any intermediate layers, the photosensitive core layer defining a top surface, the photosensitive core layer having an index of refraction $n_c$;

imagewise exposing the light-transmissive core layer to actinic radiation;

developing the photosensitive core layer to remove non-image areas of the photosensitive core layer and not remove image areas of the photosensitive core layer, thus forming a patterned, light-transmissive optical waveguide core having a pair of side walls on the polymeric, buffer layer, and partially revealing an exposed portion of the polymeric, buffer layer; and depositing an overcladding layer onto the top surface of the patterned, light-transmissive optical waveguide core, onto the pair of side walls of the patterned, light-transmissive optical waveguide core, and onto the exposed portion of the polymeric, buffer layer, the overcladding layer having an index of refraction $n_o$, such that $n_b<n_o<n_c$ and $\Delta n = n_c - n_o$.

24. A single-mode optical waveguide fabricated on a substrate, the substrate defining a surface, the single-mode optical waveguide comprising:

a polymeric, buffer layer disposed on the surface of the substrate, the polymeric, buffer layer defining a surface and having an index of refraction $n_b$;

a patterned, light-transmissive polymeric core layer disposed directly on the surface of the buffer layer, the patterned, light-transmissive core layer defining a top surface and a pair of side walls, the patterned, light-transmissive core layer having an index of refraction $n_c$;

a polymeric overcladding layer disposed on the top surface of the core, the pair of side walls of the core, and the buffer layer, the overcladding layer having an index of refraction $n_o$, such that $n_b<n_o<n_c$ and $\Delta n = n_c - n_o$, wherein the value of $\Delta n$ produces a single-mode waveguide at optical communication wavelengths; and a volume grating patterned into both the patterned, light-transmissive polymeric core layer, and the polymeric overcladding layer.

25. The single-mode optical waveguide of claim 24 further comprising a volume grating patterned into the polymeric, buffer layer.

* * * * *